US010389631B2

(12) United States Patent
Sheldon et al.

(10) Patent No.: US 10,389,631 B2
(45) Date of Patent: Aug. 20, 2019

(54) INTERNET PROTOCOL ADDRESS FILTERING METHODS AND APPARATUS

(71) Applicant: CORSA TECHNOLOGY INC., Ottawa (CA)

(72) Inventors: Stacey Sheldon, Ottawa (CA); Jonathan Sewter, Kanata (CA)

(73) Assignee: Corsa Technology Inc., Ottawa (CA)

( * ) Notice: Subject to any disclaimer, the term of this patent is extended or adjusted under 35 U.S.C. 154(b) by 0 days.

(21) Appl. No.: 15/581,454

(22) Filed: Apr. 28, 2017

(65) Prior Publication Data

US 2018/0316611 A1    Nov. 1, 2018

(51) Int. Cl.
*H04L 12/741* (2013.01)
*H04L 12/721* (2013.01)
*H04L 12/743* (2013.01)

(52) U.S. Cl.
CPC ............ *H04L 45/745* (2013.01); *H04L 45/72* (2013.01); *H04L 45/7453* (2013.01)

(58) Field of Classification Search
CPC ... H04L 45/745; H04L 45/72; H04L 45/7453; H04L 45/34; H04L 45/44; H04L 45/56; H04L 45/566; H04L 45/66; H04L 45/74; H04L 45/7457
See application file for complete search history.

(56) References Cited

U.S. PATENT DOCUMENTS

| 2008/0082658 | A1 | 4/2008 | Hsu et al. |
| 2009/0025084 | A1 | 1/2009 | Siourthas et al. |
| 2010/0082811 | A1* | 4/2010 | Van Der Merwe .......... G06F 17/30867 709/225 |
| 2012/0084423 | A1 | 4/2012 | McGleenon |

* cited by examiner

*Primary Examiner* — Dady Chery
(74) *Attorney, Agent, or Firm* — Barnes & Thornburg LLP

(57) ABSTRACT

An IP address of a received data packet is determined. An IP address map that stores set membership values indicative of whether an IP address is a member of a set of IP addresses, for every possible IP address within an IP address space of the IP address, is accessed to determine set membership for the IP address of the data packet. A further action to be performed on the packet is determined based on the set membership that is determined for the IP address of the data packet. Embodiments could be applied to source IP address filtering, destination IP address filtering, or both. Blacklist and whitelist embodiments, and associated further actions that could be applied to packets in such embodiments, are contemplated.

20 Claims, 6 Drawing Sheets

| Memory IC counter (3b) | IPv4 address (32b) | |
|---|---|---|
| | Row and Column address (29b) | bit address (3b) |

FIG. 2B

| Memory IC counter (3b) | IPv4 address (32b) | |
|---|---|---|
| | Row and Column address (26b) | bit address (6b) |

INTERNET PROTOCOL ADDRESS FILTERING METHODS AND APPARATUS

TECHNICAL FIELD

The present invention relates to computer and telecommunications networks, and in particular to protection of such networks from malicious entities.

BACKGROUND

The open access architecture of the Internet allows a user to communicate with other users and to access a global array of networked resources. The open access nature of the Internet can however, be a liability. Unwanted data traffic from malicious sites can degrade network and user operations. Examples of unwanted data traffic include: e-mail spam, phishing attacks or Distributed Denial-of-Service (DDoS) attacks.

One approach to reducing unwanted data traffic is to create a "blacklist" of malicious Internet sites and to filter data traffic based on its origin. This approach is often referred to as "blacklist filtering". Traffic originating from sites that are members of the blacklist could be subject to mitigating actions. Mitigation actions could include blocking or not transmitting data packets, reducing the rate at which data packets are transmitted or diverting the data packets for deep packet inspection, for example.

SUMMARY

According to an aspect of the present disclosure, a method involves receiving a data packet and determining an IP address of the data packet. An IP address map that stores set membership values indicative of whether an IP address is a member of a set of IP addresses for every possible IP address within an IP address space of the IP address, is accessed to determine set membership for the IP address of the data packet. A further action to be performed on the packet is determined based on the set membership that is determined for the IP address of the data packet.

An apparatus according to another aspect includes an interface to receive a data packet, a map memory, and a packet processor coupled to the interface and to the map memory. The map memory stores set membership values indicative of whether an IP address is a member of a set of IP addresses for every possible IP address within an IP address space of the IP address. The packet processor is configured to determine the IP address of the data packet, to access the map memory and determine set membership for the IP address of the data packet, and to determine a further action to be performed on the packet based on the set membership that is determined for the IP address of the data packet.

Other aspects and features of embodiments of the present disclosure will become apparent to those ordinarily skilled in the art upon review of the following description.

BRIEF DESCRIPTION OF THE DRAWINGS

The embodiments herein will be better understood from the following detailed description with reference to the drawings, in which:

FIG. 2B is a table illustrating an example correspondence between IP addresses and map memory addressing;

FIG. 2C is a table illustrating another example correspondence between IP addresses and map memory addressing;

DETAILED DESCRIPTION

Figure 1A:
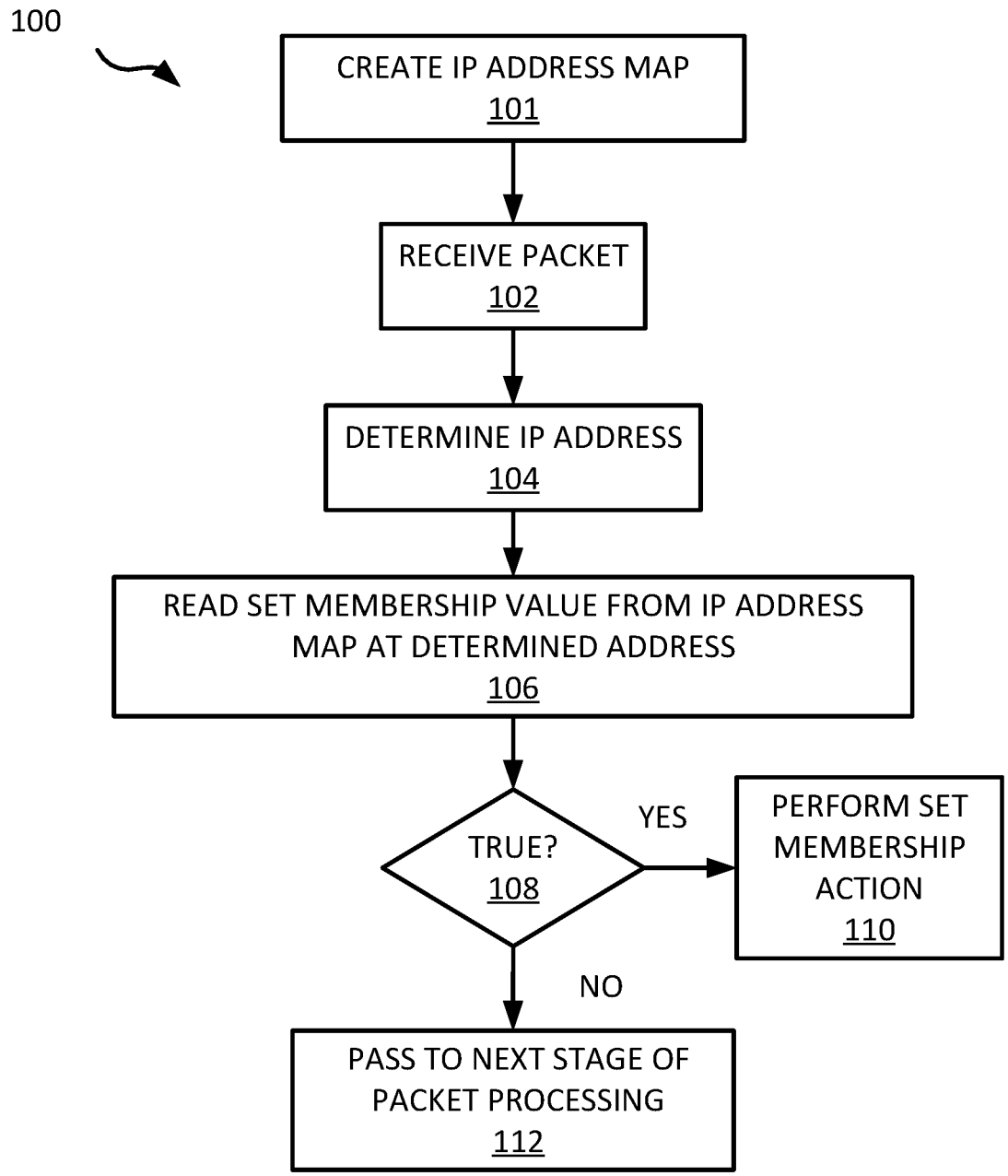
FIG. 1A is a flow diagram illustrating a method according to an embodiment.

Data traffic is composed of data packets. A data packet is organized according to well-known data protocols such as, for example the Transmission Control Protocol (TCP). A data packet is typically organized into a header and a payload. The header contains information about the packet, for example its source and destination addresses. The payload is the actual data to be transferred.

Data traffic and data packets can be characterized by the Internet Protocol (IP) address from which they originate (their source IP address) and/or the IP address to which they are destined (their destination IP address). An IP address blacklist, for example, could contain a list of IP addresses which are known or suspected to be sources of unwanted data traffic.

When a data packet is received by a network device in a conventional IP blacklist filtering method, the packet's source address is determined. A search for that address in the network device's IP blacklist is then performed. If the packet's source IP address is found in the blacklist, then mitigation measures could be taken by the network device.

An IP address blacklist could be maintained and data traffic filtered by a variety of network devices. For example, an IP address blacklist could be maintained and data traffic filtered at a gateway router of a Local Area Network (LAN). A gateway router connects a LAN to a Wide Area Network (WAN) such as the Internet. An IP blacklist could also or instead be maintained and data traffic filtered at a file server, network storage node or other network or user system within the network.

The range of possible source IP addresses could be very large. For example, a common IP address format is IP version 4 (IPv4). The IPv4 protocol is described by RFC 791, entitled "INTERNET PROTOCOL—DARPA INTERNET PROGRAM PROTOCOL SPECIFICATION", published by the Internet Engineering Task Force (IETF) in September 1981 and available at the URL https://tools.ietf.org/html/rfc791. The IPv4 format uses a 32-bit long source address field. There are therefore $2^{32}$ theoretically possible IPv4 addresses. Not all IP addresses, however, might necessarily be generally available for use. For example, some IP addresses are reserved for special purposes as specified by, for example, the Internet Engineering Task Force or the Internet Assigned Numbers Authority. For example, IP addresses 224.0.0.0 to 239.255.255.255 are reserved for multicast, and IP addresses 240.0.0.0 to 255.255.255.254 are reserved for future use.

To limit search times some IP filtering methods do not do a full 32-bit search of an IP blacklist for a match to a packet's source address. Some methods only search for a match to a truncated source IP address comprising the higher IP address bits. Some methods, for example, only look for a match with the highest 24 bits of an address. This is known as address aggregation. Aggregation sacrifices precision for search speed. When addresses are aggregated it is possible for data traffic from benign sites to be subject to mitigation if their upper address bits are the same as the upper address bits of a malicious site. This could be especially true if the addresses of malicious sites are randomly distributed.

The number of malicious sites could also be very large. For example, single Distributed Denial of Service (DDoS) attacks are known to have comprised more than 100,000 individual IP addresses. An IP blacklist could therefore comprise millions of individual IP addresses. The time required to search a list will generally scale with the length of the list. Traditional IP blacklist filtering methods which rely on searching large blacklists could be undesirably slow, compromise network performance, require undesirably expensive hardware, or suffer from unacceptably low precision.

In addition, the source IP addresses of unwanted data traffic can continually change. For example, normally benign servers or personal computers can be seized and controlled by malicious software. IP blacklists therefore need to be updated regularly and quickly.

The processes of maintaining an IP blacklist and searching for a specific IP address in a large blacklist, could undesirably increase network response times and degrade network operations. For example, in a 100 Gigabit (Gb) per second (Gbps) Ethernet connection, up to 148 million data packets could arrive per second. A conventional blacklist filtering scheme filtering a 100 Gbps Ethernet port could therefore need to perform 148 million blacklist searches per second.

Although the range of IP addresses is a large, the capacity of modern semiconductor memories is also large. For example, a single Dynamic Random Access Memory (DRAM) integrated circuit can now store more than four Gigabits (4 Gb) of data. It is therefore now feasible to create and store in semiconductor memory an IP address map for the entire IPv4 address space. The complete IP address map would contain an entry, for every single theoretically possible IPv4 address in the IPv4 address space, of a particular IPv4 address property. An IPv4 address property could be, for example, its blacklist membership. For example, an IP address blacklist map could contain entries describing blacklist membership (member or not a member) for every single IPv4 address. In an embodiment, each IP address is assigned one bit of storage. This bit could be a blacklist membership bit and store a blacklist membership value. In this example, a blacklist membership bit value of "1" could indicate membership in an IP blacklist while a blacklist membership bit value of "0" could indicate non-membership. Such an IP address map would occupy 4 Gb of storage and could be accommodated in a "map memory". The map memory could be a single 4 Gb DRAM, for example.

An IP address map might not cover every single theoretically possible IP address. For example, an IP address map might only cover an IP address space that is of interest. For example, an IP blacklist filtering method might use an IP address map covering IP addresses that are actually available for use, such as only all the unreserved IP addresses, since a malicious site might not be able to use a reserved IP address.

An IP address map could be stored in any of a variety of ways, depending on how the map memory is organized. For example, a common organization scheme for a 4 Gb DRAM is "x8" or "by eight", in which each memory address stores one byte (8 bits) of data and a memory address is 29 bits long. A "x8" organized memory has eight I/O (Input/Output) pins. The upper 29 bits of an Internet site's IP address could be used to retrieve one byte from map memory. The lowest 3 bits of the Internet site's IP address could be used to decode the Internet site's blacklist membership bit from the retrieved byte. For example, if the lowest three bits are all logic "0" then this could choose the lowest bit of the byte, if the lowest three bits are all logic "1" then this could choose the highest bit of the byte. Other values of the three least significant address bits in this example could similarly specify the position of the relevant bit in the byte that is read from the map memory.

Unlike in a conventional IP blacklist filtering scheme, there is no searching through a large IP blacklist for a match to a site's IP address. There is only a single read operation. The read operation is done in hardware and could be very fast. For example, data can be read from a Double Data Rate fourth generation (DDR4) DRAM at a rate of at least 1.6 Gb/sec/output pin. The speed of the memory read operation could also be deterministic and not vary with the number of blacklisted sites. This could make the timing of a blacklist filtering operation more deterministic and invariant with the number of blacklisted sites. Very large blacklists, even up to the size of the entire IPv4 address space, could therefore be accommodated without significantly affecting network response times and speed. An IP address map could therefore have an entry for every IP address in the IP address space of interest and address aggregation might not be required.

The IP address mapping method described above is not limited to IP blacklists and IP blacklist filtering. An IP blacklist is an example of a "set". A set is a collection of objects. Set theory is a well defined branch of mathematics. The IP addresses in an IP blacklist are members of the IP blacklist set. Set membership values indicate whether an object is a member of a particular set. For example, a set membership value of "1" could indicate that an object is a member of a particular set while a set membership value of "0" could indicate that the object is not a member of that set. Set membership values (member or not a member) for various other sets besides an IP blacklist could also or instead be stored in an IP address map. For example, an IP address map could store IP whitelist membership values. An IP whitelist is a list of IP addresses that are accorded preferred treatment with respect to other addresses, such as an expedited level of service or expedited handling or reduced security scrutiny. For example, data packets with a whitelisted IP address might be selectively routed to bypass a firewall.

A whitelist IP address map could be stored in a semiconductor memory and comprise whitelist membership values. For example, a whitelist membership bit value of "1" could signify membership in an IP whitelist while a whitelist membership bit value of "0" could signify non-membership. Membership in an IP whitelist could be determined by reading the contents of the memory address corresponding to a packet's IP address.

An address map need not be restricted to source IP address filtering. For example, an IP address map could be accessed for destination IP address filtering. An IP address map could store set membership values, indicative of whether an IP address is a member of a set of IP addresses, for every possible IP address within an IP address space of a destination IP address. The set of IP addresses in this example might comprise IP addresses of sites that are, for example, known to be targets of a distributed denial of service attack.

Destination address filtering could be useful, for example, in a scenario in which attacks are coming from malicious hosts on the Internet. These hosts could be characterized by a low "reputation" score based on traffic/activity histories and/or other characteristics associated with the hosts, for example. With reference to an "Internet zone" on one side of a security enforcement device and a "protected zone" on the other side of the security enforcement device box, the protected zone is protected from the Internet zone by blocking or applying one or more other mitigation actions to received packets based on source IP addresses. Blocking packets, for example, effectively blocks "bad" hosts in the Internet zone from sending packets to any host in the protected zone. Destination IP address filtering could be used for packet flows from the protected zone to the Internet zone. For example, packets from the protected zone could be blocked based on destination IP addresses, to block packets that are destined to known bad hosts in the Internet zone and thereby block hosts in the protected zone from sending any data to such known bad hosts in the Internet zone.

The IP addresses for which values are stored in an IP address map need not be dependent upon whether the IP address map is to be used for source IP address filtering or destination IP address filtering. The same IP address map could be accessed for both source IP address filtering and destination IP address filtering. The IP address map itself could be the same, independent of its intended application or use. In the above example of an Internet zone and a protected zone, the same IP address map data set including the known bad hosts in the Internet zone could be used for IP address filtering for packet flows in both directions. IP address filtering in this example is based on source IP addresses for the Internet zone to protected zone direction, and based on destination IP addresses in the other direction. In both directions and both types of IP address filtering, IP address status is anchored by IP addresses of the hosts in the Internet zone.

Furthermore, an address map need not be restricted to IP addresses at all. For example, an address map could be based on MAC (Media Access Controller) addresses.

In another example, an address map might be based on a digital identifier or "fingerprint". For example, a digital fingerprint could be created from a transformation such as a mathematical "hash" of a packet's various characteristics such as, for example, its source IP address, its destination IP address, and/or its protocol type. Any of various types of hashing algorithm, and/or other algorithms that transform input information into a hash, digest, or other fingerprint that is unique for different sets of input information, could be used. MD-5 and SHA-1 are examples. The fingerprint could be a 32 bit number, for example. A fingerprint map could be constructed for every theoretically possible hash. The fingerprint map entries could describe the set membership of each fingerprint. More generally, features that are disclosed herein with reference to IP addresses and IP address maps could be applied to fingerprints and fingerprint maps.

FIG. 1A is a flow chart of a set membership determination method based on an IP address map. At 101 an IP address map is created. The IP address map includes a set membership value for each address in the entire IP address space.

At 102 a data packet is received, and at 104 the IP address of the packet is determined. This could be a source address or a destination address. At 106 the set membership value for the determined address is read from the IP address map. If the membership value is true (YES at 108) then a set membership action is taken or performed at 110. If the membership value is not true (NO at 108), then the packet is passed to a next stage of processing. The next stage of processing at 112 could be, for example, routing to a network node or processing by a firewall.

It should be appreciated that the IP address map need not be created in real-time each time a packet is received. The IP address map could be created in advance and stored in a map memory, at a network device for example, for subsequent access when a new packet is received. Although not explicitly shown in FIG. 1A, the IP address map could also be updated periodically as address set membership values change.

Thus, an IP address map that stores set membership values indicative of whether an IP address is a member of a set of IP addresses for every possible IP address within an IP address space of the IP address of the received packet is accessed at 106, to determine the set membership for the IP address of the data packet. The possible IP addresses within an IP address space could be the IP addresses within an IP address space of interest, such as at least all unreserved IP addresses that are in accordance with the IP version 4 protocol.

In the example of FIG. 1A, the values that are stored in the map memory for each IP address includes a set membership value indicative of whether each possible IP address is a member of a set of IP addresses. Based on the value of the IP address property that is determined for the IP address of the data packet (set membership in the example in FIG. 1A), a determination is made at 108 as to whether the IP address of the received packet is a member of that set of IP addresses.

The determination at 108 could be considered an example of determining a further action that is to be performed on the received packet, based on the value of the IP address property. A selection could be made between the set membership action(s) for the data packet at 110 based on the IP address of the received data packet being a member of the set of IP addresses and a next stage of processing at 112 based on the IP address of the received data packet not being a member of the set of IP addresses.

Any of various set membership actions, and possibly multiple actions, could be taken with the packet based on the type of set to which its determined IP address belongs. For example, a packet with an IP address belonging to a blacklist could be blocked and possibly recorded for network analytics. A packet with an IP address belonging to a "suspected malicious" list could be transmitted at a reduced rate or sent for deep packet inspection. Blocking (not transmitting) a packet, reducing the rate of transmission of a data packet, and sending a data packet for inspection are all illustrative examples of a mitigation action.

For whitelist-based address filtering, determining an action to be performed on a packet could involve selecting between a preferred treatment action for the data packet based on the IP address of the data packet being a member of the set of IP addresses (the whitelist in this example) and a next stage of processing based on the source IP address of the data packet not being a member of the set of IP addresses. A packet with an IP address belonging to a whitelist could be transmitted at an expedited rate or allowed to bypass a security device, for example.

A set membership action could also or instead be to mark the packet for special handling in the next stage of processing. For example, the packet could be marked for dropping, rate limiting, or deep packet inspection or to bypass a security device. Other types of actions are also possible.

In some embodiments, both a source address and a destination address are determined at 104, set membership values for both addresses are read at 106, and the set membership action is taken or performed at 110 if either the source address or the destination address has a true set membership value. Source and destination IP address filtering could be performed in sequence, to determine and check one of the IP addresses (source or destination) first, and then check the other IP address only in the event of a particular result of the first check. For example, the source IP address could be determined at 104 and checked at 106, 108, and the destination IP address could be determined at 104 and checked at 106, 108 only if the set membership value for the source IP address is not true. If the received packet will be subjected to the set membership action at 110 based on the source IP address, then there is no need to perform a further check for the destination IP address in this example. If the set membership values for both the source IP address and the destination address are not true in this example, then the packet is passed to the next stage of packet processing at 112.

Figure 1B:
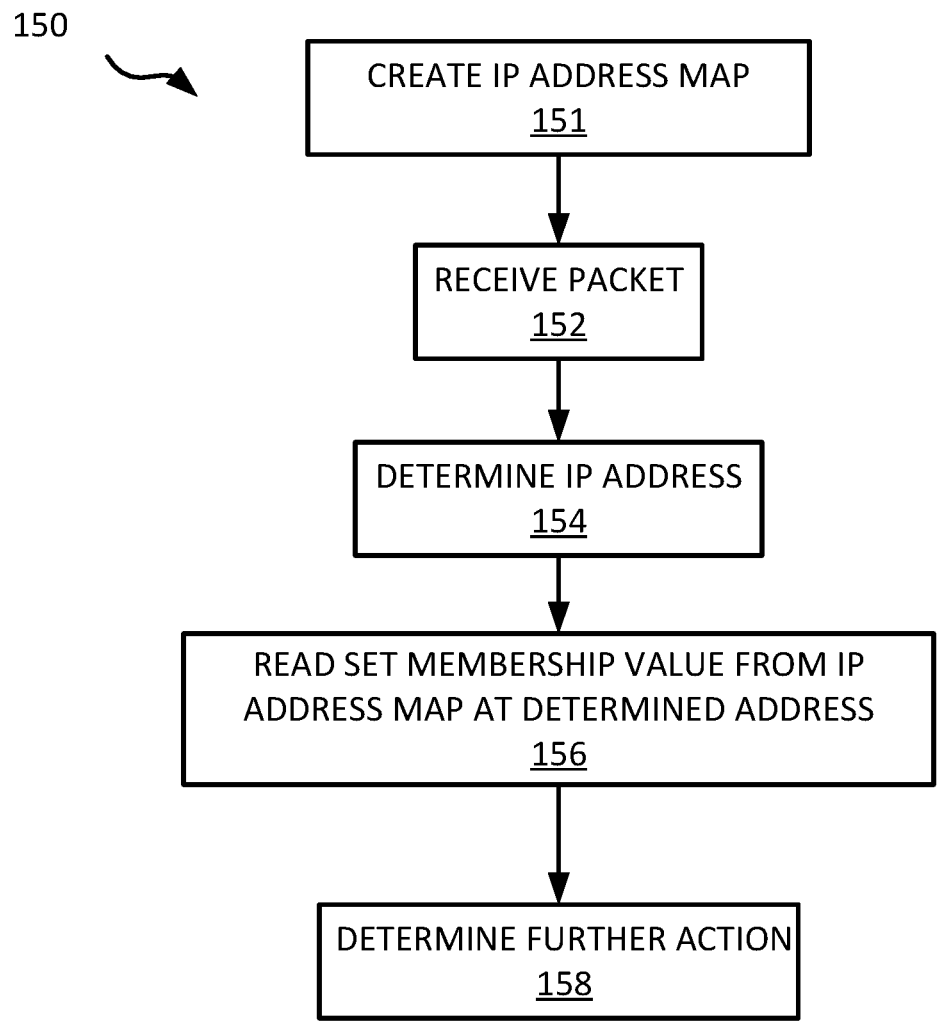
FIG. 1B is a flow diagram illustrating a method according to another embodiment.

It should also be appreciated that the set membership value of the packet might only be one factor in determining the handling of the packet. For example, other characteristics of the packet such as its protocol might also be used. FIG. 1B is a flow chart of another set membership determination method based on an IP address map. At 151 an IP address map is created. The IP address map includes a set membership value for each address in the entire IP address space of interest.

At 152 a data packet is received, and at 154 an IP address of the packet is determined. This could be a source address or a destination address. At 156 the set membership value for the determined address is read from the IP address map. At 158 a further action to be performed on the packet is determined based on the set membership value of the packet. The action determined at 158 might not be solely based on the set membership value and could be based on other factors as well. For example, a data packet might not be blocked solely because its source address is a member of a blacklist. It might only be blocked if, for example, it is also of a particular protocol type, or if the network device is heavily loaded. Thus, determination of a further action to be performed on a packet could be based on set membership, but need not be based only on set membership.

An IP address map could contain more than a single bit of information about an IP address. For example, a 32 bit word, an 8 bit byte or a 4 bit nibble might instead be used to characterize an individual IP address. In this case, more detailed information about an IP address could be stored. For example, IP addresses could be classified as members of a "clearly malicious" set and given a two bit value of "11", members of a "suspected" to be malicious set and given a two bit value of "10", or members of a "clearly good" (non-malicious) set and given a two bit value of "00". IP addresses not known to be members of any of these three sets could be assigned the two bit value "01". IP addresses could also or instead be classified as members of different level of service sets based on levels of service that packets sent from each source address are to receive. Examples of level of service sets could be, for example, a set of IP addresses which should receive expedited forwarding, a set of IP addresses which should receive assured forwarding, and a set of IP addresses which should receive best effort forwarding. These multi-bit embodiments are illustrative examples of embodiments in which the values stored in the map memory include multi-bit set membership values that are indicative of which of multiple sets of IP addresses each possible IP address is a member.

Other types of information about an IP address might also be stored in the IP address map. For example, multiple bits, describing different set membership properties, might be stored. In an embodiment, an IP address map could store four bits of set information for each IP address. The first bit could be, for example, a blacklist bit, the second bit could be a could be a whitelist bit, the third bit could be a "suspected malicious" bit and the fourth bit could be an expedited routing bit.

Figure 1C:
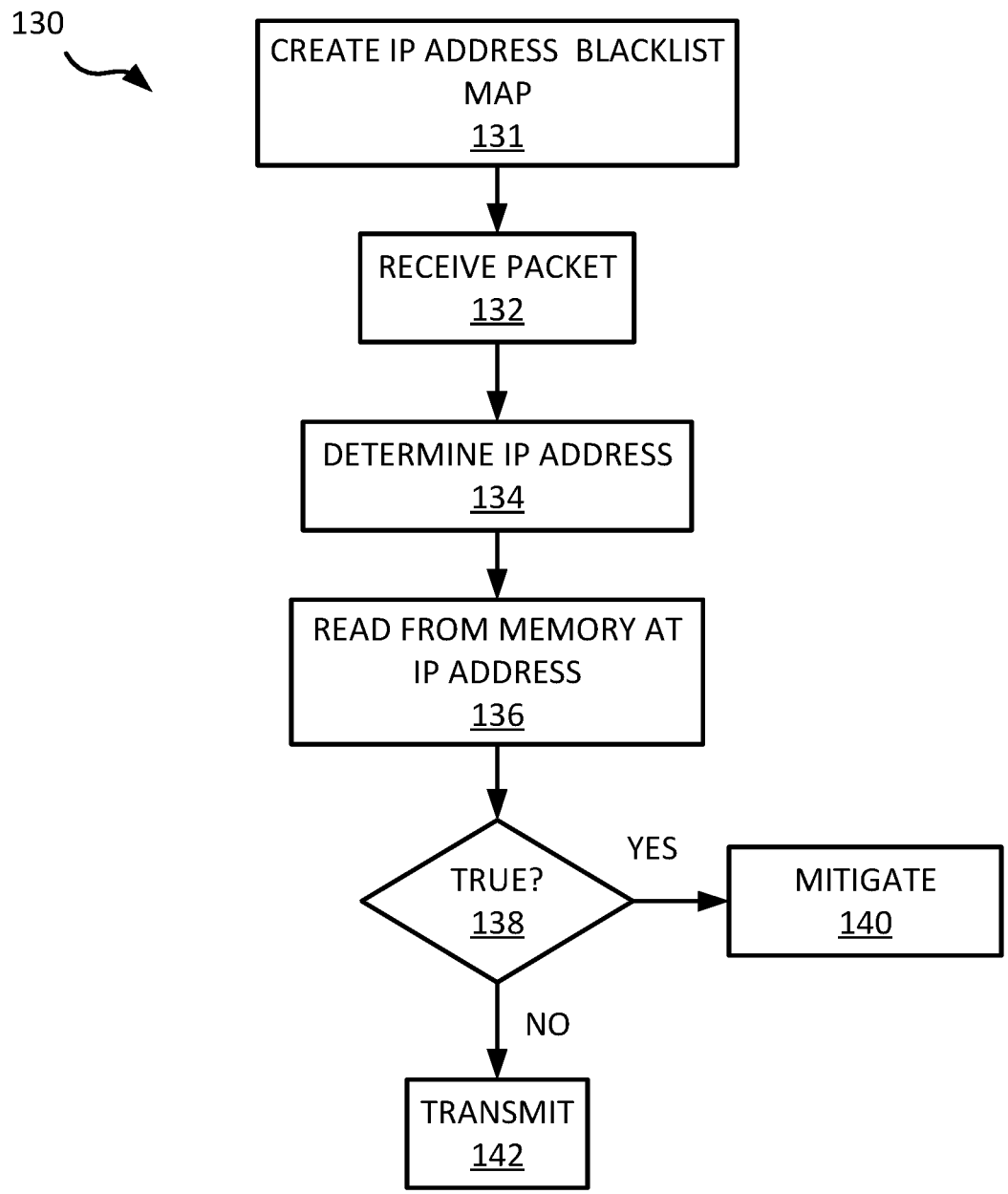
FIG. 1C is a flow diagram illustrating a method according to another embodiment.

FIG. 1C is a flow diagram of an example IP address filtering method using an IP blacklist address map. At 131 an IP address blacklist map is created. The IP address blacklist map contains entries describing blacklist membership for every IPv4 address, or at least every IP address in an IP address space of interest. An IP address blacklist map could be created from, for example, blacklists maintained by third party security sites and/or from a list created by a network security device.

At 132 a data packet is received, and at 134 an IP address of the packet is determined. At 136 the blacklist membership value for the address is read from the IP blacklist address map. If the blacklist membership is true (YES at 138) then one or more mitigation actions are taken at 140. If the blacklist membership is not true (NO at 138) then the packet is passed to the next stage of packet processing at 142. Examples of mitigation actions that could be performed at 140, and actions that could be performed in the next stage of packet processing at 142 are described elsewhere herein.

FIG. 1C is another example of a method in which an IP address map stored in a map memory that stores the value of an IP address property, specifically blacklist membership in this example, is accessed. The map memory access is shown at 136. The information in the map memory includes a set membership value indicative of whether each possible IP address is a member of a blacklist in this example. The determination at 138 represents an example of determining a further action that is to be performed on the received packet, and selecting between the mitigation action(s) for the data packet at 140 based on the IP address of the received data packet being a member of the blacklist and a next stage of processing based on the IP address of the received data packet not being a member of the blacklist.

Any of various configurations of semiconductor memory could be used to store an IP address map. For example, although a single 4 Gb DRAM memory is described above, this is an illustrative and non-limiting example; other implementations are also possible and desirable.

For example, multiple semiconductor memories, each containing a copy of the IP address map, could be used to speed up the IP address map read operation by distributing successive read operations over multiple memory ICs and "interleaving" the memory read operation. This could improve the speed of packet filtering if the read latency of the memory access is a limiting factor in determining a packet's membership information. Read latency is the time delay between a memory receiving a read address and the data becoming valid and available at the memory's output. In some memories, such as Synchronous DRAM (SDRAM) or Double Data Rate (DDR) DRAM, the read latency can be significantly longer than the memory's data transfer speed. For example, in a DDR memory, data can be transferred at twice the DDR's clock rate, whereas the read latency rate of a DDR memory can be multiple clock cycles. Interleaving attempts to hide read latency by reading from multiple memories and offsetting the timing of individual read operations such that during the latency period of one memory data is arriving from other memories.

Thus, in an embodiment, the map memory includes multiple memory devices that each store a copy of an IP address map that includes values of the address property, such as set membership values. The accessing for successive received packets could then be distributed over the multiple memory devices and interleaved.

The map memory could include multiple memory devices, with each memory device including multiple memory banks, and each memory device storing multiple copies of a different portion of the IP address map in its memory banks. The accessing for successive received packets could then be distributed over the multiple memory banks of the multiple memory devices. A memory bank comprises a sub-set of a memory device's memory locations. A memory device could be divided into memory banks of equal size and the number of memory banks could be a multiple of two. Distributing sequential memory operations over multiple banks could improve memory access times.

Figure 2A:
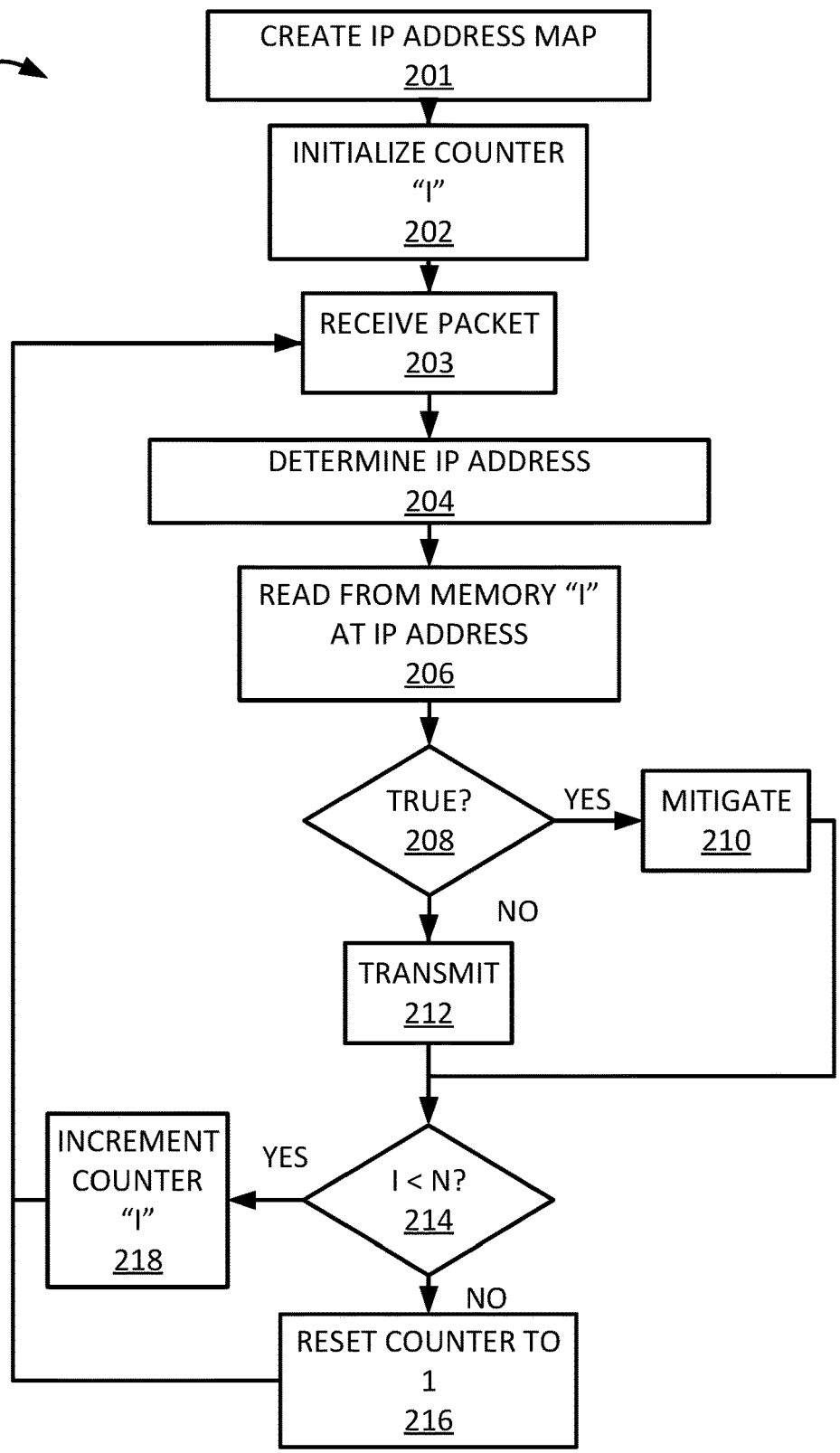
FIG. 2A is a flow diagram illustrating a method according to a further embodiment.

FIG. 2A is a flow diagram of an example set membership filtering method using multiple copies of an IP address map stored in a map memory that includes multiple, identical memory integrated circuits (ICs). At 201 an IP address map is created and stored in the map memory. At 202 the memory IC counter "I" is initialized to one. At 203 a data packet is received. At 204 an IP address of the packet is determined. At 206 the membership value for the IP address is read from the I-th memory IC. If the set membership is true (YES at 208) then one or more mitigation actions, examples of which are described elsewhere herein, are taken at 210. If the set membership is not true (NO at 208) then the packet is passed to the next stage of processing at 212. At 214 the value of the memory IC counter "I" is compared to "N" where "N" is the number of memory ICs. If the counter is less than "N" (YES at 214) then the counter is incremented by one at 218 and a new packet is received at 203. If the counter is not less than the maximum, "N" (NO at 214) then the counter is reset to 1 at 216 and a new packet is received at 203.

FIG. 2A is another example of a method in which an IP address map stored in a map memory that stores the value of an IP address property, specifically blacklist membership in this example, is accessed. The map memory access is shown at 206. The information in the map memory includes a set membership value indicative of whether each possible IP address is a member of a blacklist in this example. The determination at 208 represents an example of determining a further action that is to be performed on the received packet, and selecting between the mitigation action(s) for the data packet at 210 based on the IP address of the received data packet being a member of the blacklist and a next stage of processing at 212 based on the source IP address of the received data packet not being a member of the blacklist.

The read operation at 206 could use the value of the counter "I" as the part of the read address for the read operation. For example, the map memory could comprise eight individual memory ICs. Each IC could be a 4 GB DRAM organized as "x8" (eight input/output pins) with an address width of 29 bits. The map memory could use a 32-bit address to retrieve an 8 bit byte. The uppermost three address bits could correspond to the memory IC counter "I" and the remaining 29 bits could correspond to the selected memory IC's address. The upper 29 bits of a packet's IP address could be used as the 29-bit memory IC address and the lowest 3 bits could be used to could be used to decode the set membership bit. A decoding example is described above.

FIG. 2B is a table showing an example of this type of correspondence between IP addresses and map memory addressing.

In another map memory configuration, the IP address map is divided into sub-maps. For example, an IPv4 address map could be divided into 8 sub-maps, each comprising $2^{29}$ IP addresses. Each memory IC could store a different sub-map. Multiple copies of the sub-map could be stored in the memory IC. For example, a 4 Gb DRAM could be internally organized into 8 memory banks, with each memory bank comprising 512 Mb of storage. Eight copies of a $2^{29}$ sub-map could be stored in the DRAM's eight memory banks. Eight, 4 Gb DRAMs could be used to store the entire IPv4 address map. The eight 4 Gb DRAMs could comprise a 4 GB Dual In-line Memory Module (DIMM). A DIMM is a common type of memory module used in many computing and telecommunications applications. A DIMM includes a PCB (Printed Circuit Board) upon which are mounted its semiconductor memories, and could include additional memory intended for error correction. The 4 Gb DRAMs could be organized as "x8" (eight input/output pins) and the DIMM could have 64 input/output pins in total in this example.

A read operation could retrieve a single 64 bit word from the DIMM. Successive read operations could be distributed over the eight memory banks of each DRAM to reduce the read latency. In this case the memory IC counter "I" of FIG. 2A could be used as the bank address. FIG. 2C is a table showing another example correspondence between IP addresses and the map memory's addressing. The map memory uses a 29-bit address, including the 3-bit bank address, to retrieve a 64 bit word. The upper 3 bits are the memory ICs' bank address and are derived from the memory IC counter "I". The upper 26 bits of the IP address are used as the DRAM's row and column addresses. The lowest 6 bits of the IP address are used to decode one bit from the 64-bit word.

Other memory optimization techniques are also possible. For example, a high speed cache memory might be employed to augment the main memory storing the IP address map. The contents of more than a single address might be read from the map memory and cached in a high speed cache memory. For example, using the DIMM configuration described above a read operation could be configured to have a burst length of 8 and could retrieve 512 b of data which could be read and cached in a high speed cache memory.

If the next IP address to be evaluated corresponds to one of the cached addresses, then the membership status could be read from the cache memory rather than the map memory. This could improve the system response time.

Other types of memory besides DRAM could instead be used to store the IP address map. For example, flash memory, Static Random Access Memory (SRAM), ferroelectric Random Access Memory (FRAM) could be used.

The IP address map could also be updated by a simple memory write operation. For example, when an IP address is determined to be on a blacklist, a bit value of TRUE could be could be written to the memory location in map memory corresponding to the IP address. Updates could also be fast. For example, a DRAM's write operation typically takes the same length of time as a read operation.

The map memory could be part of a network device. A network device could determine an Internet site's set membership by reading the contents of the map memory at the memory address corresponding to the Internet site's IP address.

Figure 3:
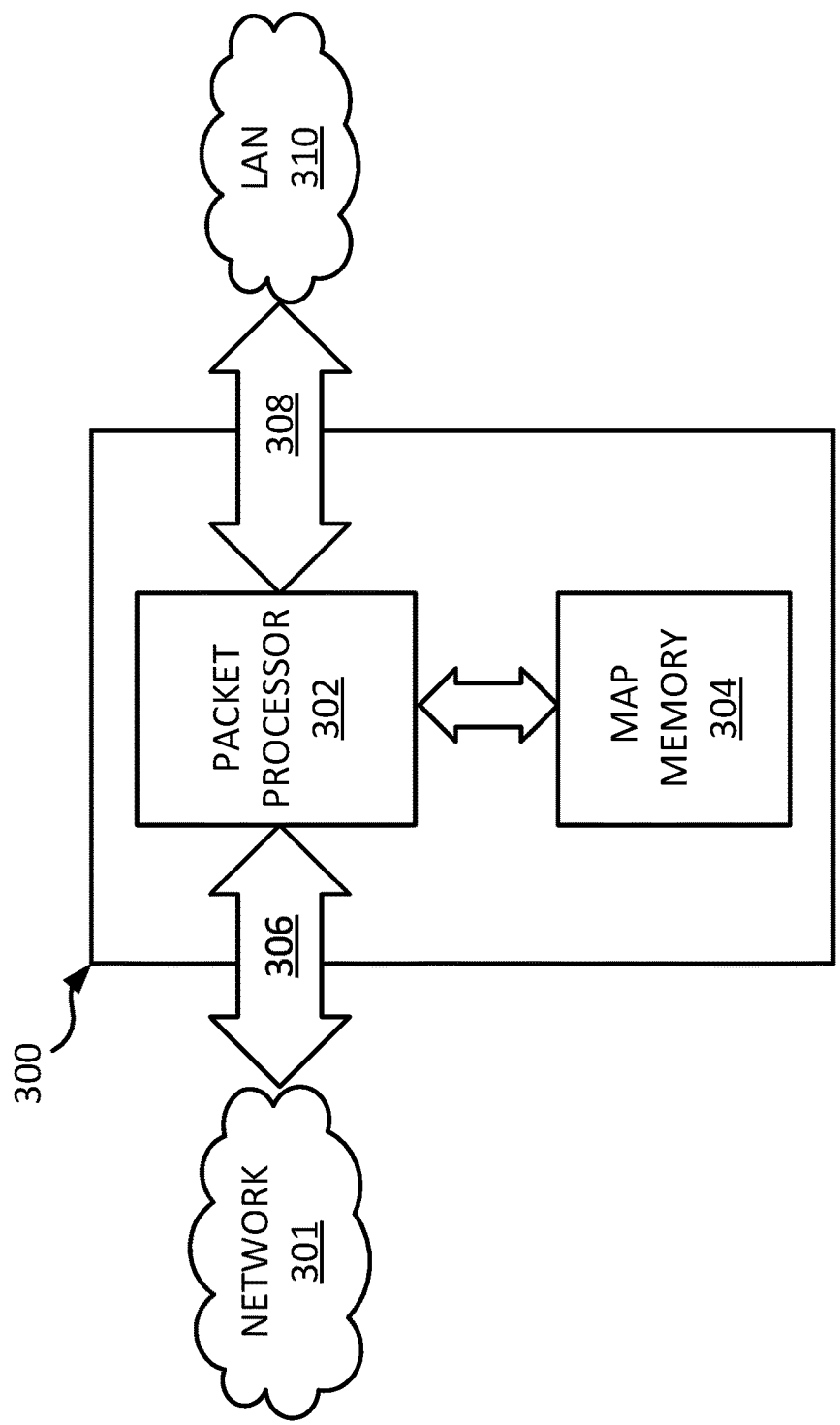
FIG. 3 is a block diagram illustrating an example apparatus according to an embodiment.

FIG. 3 is a block diagram of an example apparatus according to an embodiment. Such an apparatus could be, for example, a network device configured to determine set membership. The example apparatus 300 includes a packet processor 302, a map memory 304, a WAN port 306 and a LAN port 308. The WAN port 306 connects to a WAN 301, which could be, for example, the Internet. The LAN port 308 connects to LAN 310 which could be, for example, a business, residence, or a school. The packet processor 302 receives data packets from network 301 over WAN port 306, determines their IP addresses, and reads set membership information from the map memory 304. The packet processor 302 could perform only a packet filtering function, or it could also perform a routing function, routing packets between WAN 301 and LAN 310.

The WAN port 306 and the LAN port 308 are examples of interfaces through which data packets could be received. These ports include at least physical interfaces to communication media, and associated circuitry that enables communications over such media. Specific implementations of physical interfaces and cooperating components could vary depending on the type(s) of communication media and/or protocols that are to be supported, for example. In an embodiment, data packets that are received through a WAN port are of primary concern for DOS attacks, and are processed as disclosed herein. However, other embodiments could also or instead include other types of interfaces.

The map memory 304 could include one or more memory devices, such as any one or more of DRAM, SRAM, flash memory, and FRAM, for example.

The packet processor 302 could be implemented in circuitry, such as a processor, that is configured to implement data packet processing features as disclosed herein. In general, hardware, firmware, components which execute software, or some combination thereof might be used in implementing the packet processor 302. Electronic devices that might be suitable for implementing the packet processor 302 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. In a processor-based implementation, processor-executable instructions to configure a processor to perform operations are stored in a non-transitory processor-readable medium. Such instructions could be in the same memory device(s) as the map memory 304, or in one or more separate memory devices.

In operation, the map memory 304 stores values of an IP address property, such as set membership values, for every possible IP address within an IP address space that is of interest for the IP address of a received data packet. The packet processor 302 is configured to determine an IP address of the data packet, to access the map memory and determine the IP address property for the IP address of the data packet, and to determine a further action to be performed on the packet based on the IP address property that is determined for the IP address of the data packet. In an embodiment, the packet processor 302 is configured to access the map memory 304 and determine set membership for the IP address of the data packet, and to determine the further action based on the set membership that is determined for the IP address of the data packet.

The map memory 304 could include multiple memory devices that each store a copy of the values of the IP address property, set membership values, for example. In such embodiments, the packet processor 302 could be configured to distribute and interleave access to the map memory 304 over the multiple memory devices.

A DIMM with multiple memory banks represents an illustrative example implementation of the map memory 304. In an embodiment, the packet processor 302 is configured to access a DIMM using a bank address and a portion of the IP address of the data packet, and to determine the IP address property for the IP address using a remainder of the IP address of the data packet that is not used to access the DIMM. FIGS. 2B and 2C illustrate examples of such addressing.

Each of multiple memory devices in a map memory could include multiple memory banks, with each memory device storing multiple copies of a different portion of the IP address map in its memory banks. In such an implementation, the packet processor 302 could be configured to distribute successive read operations over the multiple memory banks of the multiple memory devices.

What has been described is merely illustrative of the application of principles of embodiments of the present disclosure. Other arrangements and methods can be implemented by those skilled in the art.

For example, although described primarily in the context of methods and apparatus, other embodiments could be implemented in the form of a non-transitory processor-readable medium storing instructions which, when executed by one or more processors, cause the one or more processors to perform a method as described herein.

What is claimed is:

1. A method comprising: receiving a data packet, determining an IP address of the data packet, accessing an IP address map that stores set membership values indicative of whether an IP address is a member of a set of IP addresses for every possible IP address within an IP address space of the IP address, to determine set membership for the IP address of the data packet; and determining a further action to be performed on the packet based on the set membership that is determined for the IP address of the data packet, wherein the determining comprises selecting between a preferred treatment action for the data packet based on the IP address of the data packet being a member of the set of IP addresses and a next stage of processing based on the IP address of the data packet not being a member of the set of IP addresses.

2. The method of claim 1, wherein the IP address space comprises at least all the unreserved IP addresses in accordance with the IP version 4 protocol.

3. The method of claim 1, wherein the IP address space comprises $2^{32}$ addresses.

4. The method of claim 1, wherein the IP address of the data packet is a destination address.

5. The method of claim 1, wherein the IP address of the data packet is a source address.

6. The method of claim 1, wherein the determining comprises selecting between a set membership action for the data packet based on the IP address of the data packet being a member of the set of IP addresses and a next stage of processing based on the IP address of the data packet not being a member of the set of IP addresses.

7. The method of claim 1, wherein the set of IP addresses comprises a whitelist.

8. The method of claim 1, wherein the set of IP addresses comprises a blacklist.

9. The method of claim 8, wherein the determining comprises selecting between a mitigation action for the data packet based on the IP address of the data packet being a member of the set of IP addresses and a next stage of processing based on the IP address of the data packet not being a member of the set of IP addresses.

10. The method of claim 9, wherein the mitigation action comprises one of: not transmitting the data packet, reducing the rate of transmission of the data packet or sending the data packet for inspection.

11. The method of claim 1, wherein each of the set membership values comprises a single bit of information.

12. The method of claim 1, wherein the IP address map is stored in a map memory, wherein the map memory comprises multiple memory devices that each store a copy of an IP address map including the set membership values, and wherein the accessing for successive received packets is distributed over the multiple memory devices and interleaved.

13. The method of claim 1, wherein the set membership values comprise an IP address map, wherein the IP address map is stored in a map memory, the map memory comprising multiple memory devices, each memory device comprising multiple memory banks, each memory device storing multiple copies of a different portion of the IP address map in its memory banks, and wherein the accessing for successive received packets is distributed over the multiple memory banks of the multiple memory devices.

14. The method of claim 1, further comprising: storing in a map memory the IP address map comprising the set membership values.

15. The method of claim 1, wherein the values comprise multi-bit set membership values indicative of which of multiple sets of IP addresses each possible IP address is a member.

16. An apparatus comprising: an interface to receive a data packet; a map memory storing set membership values indicative of whether an IP address is a member of a set of IP addresses for every possible IP address within an IP address space of the IP address; and a packet processor coupled to the interface and to the map memory to determine an IP address of the data packet, to access the map memory and determine set membership for the IP address of the data packet, and to determine a further action to be performed on the packet based on the set membership that is determined for the IP address of the data packet, wherein the packet processor is configured to determine the further action by selecting between a set membership action for the data packet based on the IP address of the data packet being a member of the set of IP addresses and a next stage of processing based on the IP address of the data packet not being a member of the set IP addresses.

17. The apparatus of claim 16, wherein the map memory comprises any one or more of: Dynamic Random Access Memory (DRAM), Static Random Access Memory (SRAM), flash memory, and ferroelectric Random Access Memory (FRAM).

18. The apparatus of claim 16, wherein the set membership values comprise an IP address map, wherein the map memory comprises multiple memory devices that each store a copy of the IP address map, and wherein the packet processor is configured to distribute and interleave access to the map memory over the multiple memory devices.

19. The apparatus of claim 16, wherein the set membership values comprise an IP address map, wherein the map memory comprises multiple memory devices, each memory device comprising multiple memory banks, each memory device storing multiple copies of a different portion of the IP address map in its memory banks, and wherein the packet processor is configured to distribute successive read operations over the multiple memory banks of the multiple memory devices.

20. The apparatus of claim 16, wherein the IP address space comprises at least all the unreserved IP addresses in accordance with the IP version 4 protocol.

* * * * *